US012423800B2

(12) United States Patent
Ofir et al.

(10) Patent No.: US 12,423,800 B2
(45) Date of Patent: Sep. 23, 2025

(54) MACHINE LEARNING BASED DEFECT EXAMINATION FOR SEMICONDUCTOR SPECIMENS

(71) Applicant: Applied Materials Israel Ltd., Rehovot (IL)

(72) Inventors: Yehonatan Hai Ofir, Rehovot (IL); Yotam Nissim Ben Shoshan, Rehovot (IL); Ran Badanes, Rishon le-Zion (IL); Boris Sherman, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 259 days.

(21) Appl. No.: 18/130,845

(22) Filed: Apr. 4, 2023

(65) Prior Publication Data

US 2024/0338811 A1  Oct. 10, 2024

(51) Int. Cl.
  *G06T 7/00* (2017.01)
  *G06N 3/0455* (2023.01)
(52) U.S. Cl.
  CPC ........... *G06T 7/001* (2013.01); *G06N 3/0455* (2023.01); *G06T 2207/20081* (2013.01); *G06T 2207/20084* (2013.01)
(58) Field of Classification Search
  CPC ........... G06T 7/001; G06T 2207/20081; G06T 2207/20084; G06T 7/0004; G06T 2207/10061; G06T 2207/30148; G06T 7/30; G06N 3/0455; G06N 3/045; G06N 3/0464; G06N 3/084; G06N 20/00; G06V 10/40; G06V 10/765; G06V 10/82; G01N 21/8851; G01N 21/9501; G01N 21/956;
  (Continued)

(56) References Cited

U.S. PATENT DOCUMENTS

| 2019/0287230 A1* | 9/2019 | Lu | G06N 3/088 |
| 2023/0069493 A1* | 3/2023 | Kim | G06T 7/001 |
| 2024/0280522 A1* | 8/2024 | Vanrompay | G06N 3/045 |

OTHER PUBLICATIONS

T. Nakazawa and D. V. Kulkarni, "Anomaly Detection and Segmentation for Wafer Defect Patterns Using Deep Convolutional Encoder-Decoder Neural Network Architectures in Semiconductor Manufacturing," in IEEE Transactions on Semiconductor Manufacturing, vol. 32, No. 2, pp. 250-256, May 2019 (Year: 2019).*

(Continued)

*Primary Examiner* — Emily C Terrell
(74) *Attorney, Agent, or Firm* — Lowenstein Sandler LLP

(57) ABSTRACT

There is provided a system and method of examination a semiconductor specimen. The method includes obtaining a runtime image of the specimen; processing the runtime image using a first machine learning (ML) model to extract a set of runtime features representative of a set of patches in the runtime image; and comparing the set of runtime features with a bank of reference features, giving rise to an anomaly map indicative of one or more defective patches in the runtime image. The bank of reference features is previously generated by obtaining a plurality of synthetic reference images generated by a second ML model based on a plurality of actual images; and processing the plurality of synthetic reference images by the first ML model to extract, for each synthetic reference image, a set of reference features representative thereof, giving rise to the bank of reference features.

20 Claims, 5 Drawing Sheets

(58) Field of Classification Search
CPC ....... G01N 23/2251; G01N 2021/8854; G01N 2021/8887; G01N 2223/401; G01N 2223/418; G01N 2223/6116; G01N 2223/6462; G01Q 60/24
See application file for complete search history.

(56) References Cited

OTHER PUBLICATIONS

Park, S.; You, C. Deep Convolutional Generative Adversarial Networks-Based Data Augmentation Method for Classifying ClassImbalanced Defect Patterns in Wafer Bin Map. Appl. Sci. 2023, 13, 5507. https://doi.org/10.3390/app13095507 (Year: 2023).*

Ofir, Nati & Shoshan, Yotam & Badanes, Ran & Sherman, Boris. (2023). Defect Detection Approaches Based on Simulated Reference Image. 10.48550/arXiv.2303.11971. (Year: 2023).*

Ofir et al., "Semi supervised defect detection based on simulated reference image," Jan. 2023, Applied Materials, 2 pgs.

* cited by examiner

MACHINE LEARNING BASED DEFECT EXAMINATION FOR SEMICONDUCTOR SPECIMENS

TECHNICAL FIELD

The presently disclosed subject matter relates, in general, to the field of examination of a semiconductor specimen, and more specifically, to machine learning based defect examination.

BACKGROUND

Current demands for high density and performance, associated with ultra large-scale integration of fabricated devices, require submicron features, increased transistor and circuit speeds, and improved reliability. As semiconductor processes progress, pattern dimensions, such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Examination can be provided by using non-destructive examination tools during or after manufacture of the specimen to be examined. Examination generally involves generating certain output (e.g., images, signals, etc.) for a specimen by directing light or electrons to the wafer and detecting the light or electrons from the wafer. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures, such as etching, depositing, planarization, growth such as epitaxial growth, implantation, etc. The examination steps can be performed a multiplicity of times, for example after certain process procedures, and/or after the manufacturing of certain layers, or the like. Additionally or alternatively, each examination step can be repeated multiple times, for example for different wafer locations, or for the same wafer locations with different examination settings.

Examination processes are used at various steps during semiconductor fabrication for the purpose of process control, such as, e.g., defect related operations, as well as metrology related operations. Effectiveness of examination can be improved by automatization of process(es) such as, for example, defect detection, Automatic Defect Classification (ADC), Automatic Defect Review (ADR), image segmentation, automated metrology-related operations, etc.

Automated examination systems ensure that the parts manufactured meet the quality standards expected, and provide useful information on adjustments that may be needed to the manufacturing tools, equipment and/or compositions, depending on the type of defects identified. In some cases, machine learning technologies can be used to assist the automated examination process so as to promote higher performance.

SUMMARY

In accordance with certain aspects of the presently disclosed subject matter, there is provided a computerized system of examining a semiconductor specimen, the system comprising a processing and memory circuitry (PMC) configured to: obtain a runtime image of the semiconductor specimen acquired by an examination tool; process the runtime image using a first machine learning (ML) model to extract a set of runtime features representative of a set of patches in the runtime image, wherein the first ML model is previously trained and usable for feature extraction; and compare the set of runtime features with a bank of reference features, giving rise to an anomaly map indicative of one or more defective patches in the runtime image of which one or more corresponding runtime features are not matched in the bank of reference features according to a matching measure, wherein the bank of reference features is previously generated by: obtaining a plurality of synthetic reference images generated by a second ML model based on a plurality of actual images acquired from one or more specimens, wherein the second ML model is previously trained for reference image simulation; and processing the plurality of synthetic reference images by the first ML model to extract, for each synthetic reference image, a set of reference features representative thereof, giving rise to the bank of reference features representative of the set of synthetic reference images.

In addition to the above features, the system according to this aspect of the presently disclosed subject matter can comprise one or more of features (i) to (x) listed below, in any desired combination or permutation which is technically possible:

(i). The processing of the plurality of synthetic reference images can further comprise subsampling the set of reference features using a coreset, and storing the subsampled set of reference features for each synthetic reference image in a memory bank, thereby constituting the bank of reference features.

(ii). The comparing can comprise, for each runtime feature of a respective patch, searching for a reference feature in the bank of reference features, and computing an anomaly score for the respective patch using the matching measure between the runtime feature and the reference feature, wherein the anomaly score for each patch constitutes the anomaly map corresponding to the input image.

(iii). The runtime image can be divided into the set of patches in accordance with a predetermined grid, and each runtime feature is represented as a feature vector corresponding to a respective patch.

(iv). The first ML model can be a representation model previously trained using a training set of images to learn representative features thereof.

(v). The second ML model can be a generative model previously trained using unsupervised learning based on a training set of nominal images of one or more training specimens.

(vi). The second ML model can be a generative model previously trained using supervised learning based on a training set comprising one or more pairs of training images of training specimens, each pair including a defective image and a corresponding reference image.

(vii). The second ML model can comprise an encoder network and a decoder network, and the first ML model is implemented using the encoder network of the second ML model upon the second ML model being trained.

(viii). The defective patches identified in the anomaly map can be usable as defective training samples to form part of a training set for training a ML model for defect examination.

(ix). The defective patches identified in the anomaly map can be reviewed by a human annotator prior to being used as part of the training set.

(x). Defect detection performance represented in the anomaly map can be improved by using the set of synthetic reference images as compared to using a set of actual nominal images.

In accordance with other aspects of the presently disclosed subject matter, there is provided a method of examining a semiconductor specimen, the method performed by a processor and memory circuitry (PMC) and comprising: obtaining a runtime image of the semiconductor specimen acquired by an examination tool; processing the runtime image using a first machine learning (ML) model to extract a set of runtime features representative of a set of patches in the runtime image, wherein the first ML model is previously trained and usable for feature extraction; and comparing the set of runtime features with a bank of reference features, giving rise to an anomaly map indicative of one or more defective patches in the runtime image of which one or more corresponding runtime features are not matched in the bank of reference features according to a matching measure, wherein the bank of reference features is previously generated by: obtaining a plurality of synthetic reference images generated by a second ML model based on a plurality of actual images acquired from one or more specimens, wherein the second ML model is previously trained for reference image simulation; and processing the plurality of synthetic reference images by the first ML model to extract, for each synthetic reference image, a set of reference features representative thereof, giving rise to the bank of reference features representative of the set of synthetic reference images.

These aspects of the disclosed subject matter can comprise one or more of features (i) to (x) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of examining a semiconductor specimen, the method comprising: obtaining a runtime image of the semiconductor specimen acquired by an examination tool; processing the runtime image using a first machine learning (ML) model to extract a set of runtime features representative of a set of patches in the runtime image, wherein the first ML model is previously trained and usable for feature extraction; and comparing the set of runtime features with a bank of reference features, giving rise to an anomaly map indicative of one or more defective patches in the runtime image of which one or more corresponding runtime features are not matched in the bank of reference features according to a matching measure, wherein the bank of reference features is previously generated by: obtaining a plurality of synthetic reference images generated by a second ML model based on a plurality of actual images acquired from one or more specimens, wherein the second ML model is previously trained for reference image simulation; and processing the plurality of synthetic reference images by the first ML model to extract, for each synthetic reference image, a set of reference features representative thereof, giving rise to the bank of reference features representative of the set of synthetic reference images.

These aspects of the disclosed subject matter can comprise one or more of features (i) to (x) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
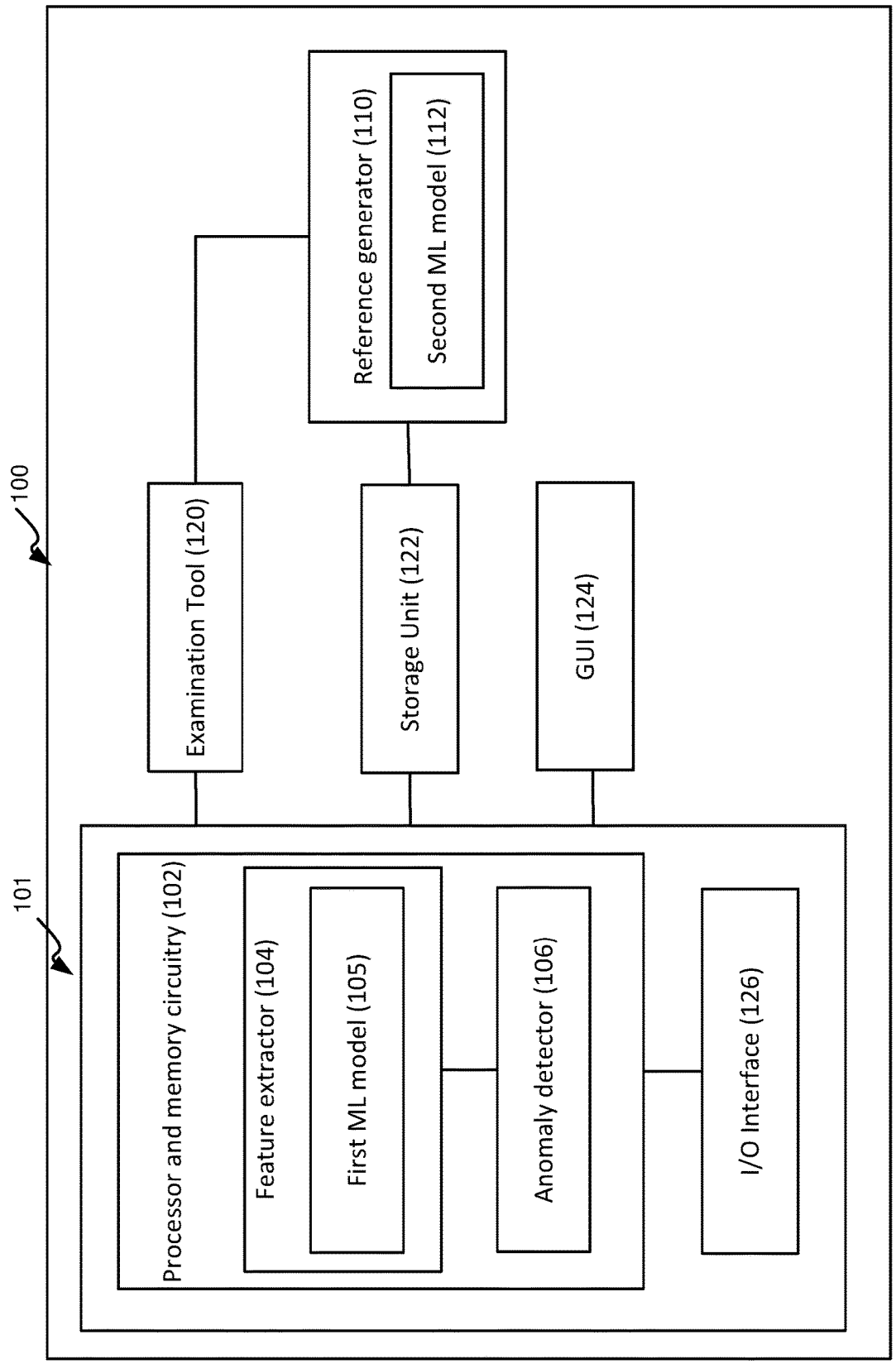
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components, and circuits have not been described in detail so as not to obscure the presently disclosed subject matter.

Unless specifically stated otherwise, as apparent from the following discussions, it is appreciated that throughout the specification discussions utilizing terms such as "examining", "obtaining", "processing", "extracting", "comparing", "generating", "training", "acquiring", "subsampling", "storing", "searching", "computing", "dividing", "reviewing", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities, including, by way of non-limiting example, the examination system, the defect examination system, the training system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as a "false alarm" defect) which can be disregarded because it has no effect on the functionality of the completed device and does not impact yield.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

The term "image(s)" or "image data" used in the specification should be expansively construed to cover any original images/frames of the specimen captured by an examination tool during the fabrication process, derivatives of the captured images/frames obtained by various pre-processing stages, and/or computer-generated synthetic images (in some cases based on design data). Depending on the specific way of scanning (e.g., one-dimensional scan such as line scanning, two-dimensional scan in both x and y directions, or dot scanning at specific spots, etc.), image data can be represented in different formats, such as, e.g., as a gray level profile, a two-dimensional image, or discrete pixels, etc. It is to be noted that in some cases the image data referred to herein can include, in addition to images (e.g., captured images, processed images, etc.), numeric data associated with the images (e.g., metadata, hand-crafted attributes, etc.). It is further noted that images or image data can include data related to a processing step/layer of interest, or a plurality of processing steps/layers of a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

The process of semiconductor fabrication often requires multiple sequential processing steps/layers, each one of which could possibly cause errors that may lead to yield loss. Examples of various processing steps can include lithography, etching, depositing, planarization, growth (such as, e.g., epitaxial growth), and implantation, etc. Various defect examination operations, such as defect detection, defect review, and defect classification, etc., can be performed at different processing steps/layers during the fabrication process to monitor and control the process. The examination operations can be performed a multiplicity of times, for example after certain processing steps/layers, or the like.

Run-time defect examination conventionally employs a two-phase procedure, e.g., inspection of a specimen to detect potential defects, followed by review of sampled locations of the potential defects. Various detection methods can be used for detecting defects on the inspection output. By way of example, a classic die-to-reference detection algorithm can be typically used, where an inspection image of a target area and one or more reference images are captured and compared to each other, resulting a defect map indicative of locations of suspected defects.

There are certain disadvantages with respect to the above-described detection methods. For instance, the die-to-reference detection method requires the acquisition of at least two images (i.e., in cases of one inspection image and one reference image) which doubles the image acquisition time of the inspection tool. In addition, detection sensitivity may also be affected due to residual variations and noises between the two images.

As described above, in some cases, machine learning (ML) technologies can be used to assist the defect examination process so as to provide accurate and efficient solutions. For purpose of providing a well-trained, accurate ML model that is robust with respect to various variations in actual production, training images must be sufficient in terms of quantity, quality, and variance, etc., and the images need to be annotated with accurate labels for supervised learning.

However, in some cases, such training data can be difficult to collect. By way of example, true defects (i.e., DOIs) are often scarce in number, and subtle in appearance, thus tend to be buried within nuisances and noises and are very difficult to detect. Therefore, training defect samples for certain types of DOIs may be very limited in number and does not include sufficient variances of the DOIs, taking into consideration different variations (such as, e.g., process variations and color variations) caused by some physical processes of the specimen. An ML model trained with insufficient defect training samples may not be able to detect unrepresented defects in production, thus cannot meet the required detection sensitivity (e.g., the detection result may have a high false alarm rate and low capture rate of the DOIs).

In addition, it may be particularly challenging to obtain label data for the training images containing defects, as human identification and annotation of such true defects, which are rare and hard to detect, typically takes time and effort, and, in some cases, may be error prone. Inaccurate labelling can mislead the ML model, and cause the model to be unable to identify the actual DOIs, or misclassify the defects in runtime, thus affecting detection performance.

On the other hand, defect examination based on unsupervised learning may be computationally expensive, as the model learns and observes patterns from raw data without any training labels or prior knowledge, which is time consuming, while at the same time providing less accurate results.

Accordingly, certain embodiments of the presently disclosed subject matter propose a system and method for defect examination of semiconductor specimens, which do not have one or more of the disadvantages described above. The present disclosure proposes to process a runtime image using a pre-trained first ML model (e.g., representation model) to extract a set of patch-level runtime features representative of the runtime image, and compare the set of runtime features with a bank of reference features to obtain an anomaly map indicative of one or more defective patches of which the corresponding runtime features are not matched in the bank of reference features according to a matching measure. In particular, the bank of reference features used in the runtime examination is previously generated based on a plurality of synthetic reference images generated by a pre-trained second ML model (e.g., generative model) based on a plurality of actual images acquired from one or more specimens, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect classification of various types, segmentation, and/or metrology operations with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes including, by way of non-limiting example, scanning, imaging, sampling, reviewing, measuring, classifying, and/or other processes provided with regard to the specimen or parts thereof. The examination tools 120 can be implemented as machines of various types. In some embodiments, the examination tool can be implemented as an electron beam machine/tool, such as e.g., Scanning Electron Microscope (SEM), Atomic Force Microscopy (AFM), or Transmission Electron Microscope (TEM), etc.

By way of example, scanning electron microscopes (SEM) is a type of electron microscope that produces images of a specimen by scanning the specimen with a focused beam of electrons. An SEM is capable of accurately inspecting and measuring features during the manufacture of semiconductor wafers. The electrons interact with atoms in the specimen, producing various signals that contain information on the surface topography and/or composition of the specimen.

According to certain embodiments, the examination tool 120 can include one or more inspection tools and/or one or more review tools. The inspection tools can scan the specimen to capture inspection images and detect potential defects in accordance with a defect detection algorithm. The output of the detection module is a defect map indicative of defect candidate distribution on the semiconductor specimen. The review tools can be configured to capture review images at locations of the defect candidates in the map, and review the review images for ascertaining whether a defect candidate is indeed a DOI. In some cases, at least one of the examination tools 120 has metrology capabilities. Such an examination tool is also referred to as a metrology tool. The metrology tool can be configured to generate image data in response to scanning the specimen and perform metrology operations based on the image data.

In some cases, the same examination tool can provide low-resolution image data and high-resolution image data. The resulting image data can be transmitted-directly or via one or more intermediate systems- to system 101. The present disclosure is not limited to any specific type of examination tools and/or the representation/resolution of image data resulting from the examination tools.

According to certain embodiments of the presently disclosed subject matter, the examination system 100 comprises a computer-based system 101 operatively connected to the examination tools 120 and capable of performing defect examination for semiconductor specimens based on machine learning (ML). In some embodiments, system 101 can be configured for runtime defect examination using a trained ML model based on runtime images of semiconductor specimens obtained during a fabrication process thereof. The aforementioned ML model is also referred to herein as a first ML model (for the purpose of differentiating from a second ML model as described below), or as a representation model, which is previously trained and usable for feature extraction. Such a system 101 is also referred to as a defect examination system.

In some embodiments, system 101 can be configured as a training system capable of training the first ML model during a training/setup phase. In some further embodiments, the detected defects by the first ML model can be used as defective training samples for enriching a training set usable for training a new ML model for automatic defect examination, such as ADR or ADC, under supervised learning. In such cases, system 101 can also be referred to as a training system for the new ML model.

System 101 includes a processor and memory circuitry (PMC) 102 operatively connected to a hardware-based I/O interface 126. PMC 102 is configured to provide processing necessary for operating the system, as further detailed with reference to FIGS. 2-7 and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

As described above, in some embodiments, system 101 can be configured to perform defect examination in runtime based on runtime images of a specimen acquired during a fabrication process thereof in the fab. In such cases, one or more functional modules comprised in PMC 102 can include a feature extractor 104 and an anomaly detector 106. The feature extractor 104 further comprises a first ML model 105 which has been previously trained in a training phase and usable for feature extraction.

Upon obtaining a runtime image of a specimen acquired by the examination tool 120, the feature extractor 104 can be configured to process the runtime image using a first ML model 105 to extract a set of runtime features representative of a set of patches in the runtime image. The anomaly detector 106 can be configured to compare the set of runtime features with a bank of reference features stored in a memory bank, giving rise to an anomaly map indicative of one or more defective patches in the input image, of which one or more corresponding runtime features are not matched in the bank of reference features according to a matching measure.

The bank of reference features can be previously generated and stored in a setup phase. As illustrated in FIG. 1, system 100 can further comprise a reference generator 110 configured to generate a plurality of synthetic reference images. Specifically, the reference generator 110 can comprise a second ML model 112, and the plurality of synthetic reference images can be generated by the second ML model 112 based on a plurality of actual images acquired from one or more specimens by the examination tool 120. The second ML model is previously trained in a training phase for reference image generation/simulation. The second ML model is also referred to herein as a generative model.

The plurality of synthetic reference images can be then sent to the trained first ML model 105 (e.g., via a storage unit 122) for processing, so as to extract, for each synthetic reference image, a set of reference features representative thereof. The set of reference features for each synthetic reference image constitutes the bank of reference features representative of the set of synthetic reference images.

As aforementioned, in certain embodiments, the defects detected by the first ML model can be used as defective training samples for enriching a training set usable for training a new ML model. System 101 can be configured as a training system capable of training the new ML model during a training phase. In such cases, functional modules comprised in PMC 102 can include a training set generator, a training module, and the new ML model. The training set generator can be configured to add the detected defects by the first ML model to a training set so as to enrich the defective samples thereof. The training module can be configured to train the new ML model using the training set. The new ML model, upon being trained, is usable to perform automatic defect examination in runtime based on runtime images of semiconductor specimens to be examined (i.e., production specimens). In some embodiments, system 101 can be configured as a training system for training the first ML model 105.

Operation of system 101, PMC 102 and the functional modules therein will be further detailed with reference to FIGS. 2-7.

According to certain embodiments, the first ML model 106 and the second ML model 112 referred to herein can be implemented as various types of machine learning models. The learning algorithm used by the ML models can be any of the following: supervised learning, unsupervised learning, or semi-supervised learning, etc. The presently disclosed subject matter is not limited to the specific type of ML model or the specific type or learning algorithm used by the ML model.

In some embodiments, the first ML model 106 and/or the second ML model 112 can be implemented as a deep neural network (DNN). DNN can refer to a supervised or unsupervised DNN model which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized into a plurality of DNN sub-networks. Each layer of DNN can include multiple basic computational elements (CE) typically referred to in the art as dimensions, neurons, or nodes.

The weighting and/or threshold values associated with the CEs of a deep neural network and the connections thereof can be initially selected prior to training, and can be further iteratively adjusted or modified during training to achieve an optimal set of weighting and/or threshold values in a trained DNN. After each iteration, a difference can be determined between the actual output produced by the DNN module, and the target output associated with the respective training set of data. The difference can be referred to as an error value. Training can be determined to be complete when a loss/cost function indicative of the error value is less than a predetermined value, or when a limited change in performance between iterations is achieved. A set of input data used to adjust the weights/thresholds of a deep neural network is referred to as a training set.

It should be noted that the teachings of the presently disclosed subject matter are not bound by specific architecture of the ML or DNN as described above.

In some cases, additionally to system 101, the examination system 100 can comprise one or more examination modules, such as, e.g., defect detection module and/or Automatic Defect Review Module (ADR) and/or Automatic Defect Classification Module (ADC) and/or a metrology-related module and/or other examination modules which are usable for examination of a semiconductor specimen. The one or more examination modules can be implemented as stand-alone computers, or their functionalities (or at least part thereof) can be integrated with the examination tool 120. In some cases, the output of system 101, e.g., the anomaly maps, and/or the detected defects, etc., can be provided to the one or more examination modules for further processing. In some cases, the first ML model 105 can be comprised in the one or more examination modules. Optionally, the first ML model can be shared between the examination modules or, alternatively, each of the one or more examination modules can comprise its own ML model.

According to certain embodiments, system 101 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store runtime images/training images and/or derivatives thereof produced by the examination tool 120, as well as synthetic reference images generated by the reference generator 110. Accordingly, the images can be retrieved from the storage unit 122 and provided to the PMC 102 for further processing. In some cases, the storage unit 122 can comprise a memory bank configured to store the bank of reference features.

In some embodiments, system 101 can optionally comprise a computer-based Graphical User Interface (GUI) 124 which is configured to enable user-specified inputs related to system 101. For instance, the user can be presented with a visual representation of the specimen (for example, by a display forming part of GUI 124), including image data of the specimen. The user may be provided, through the GUI, with options of defining certain operation parameters, such as, e.g., configuration of the ML models, patch sizes, etc. The user may also view the operation results, such as, e.g., the anomaly maps and/or detected defects, on the GUI.

In some cases, system 101 can be further configured to send, via I/O interface 126, the operation results to the examination tool 120 for further processing. In some cases, system 101 can be further configured to send the results to the storage unit 122, and/or external systems (e.g., Yield Management System (YMS) of a fabrication plant (fab)). A yield management system (YMS) in the context of semiconductor manufacturing is a data management, analysis, and tool system that collects data from the fab, especially during manufacturing ramp ups, and helps engineers find ways to improve yield. A YMS helps semiconductor manufacturers and fabs manage high volumes of production analysis with fewer engineers. These systems analyze the yield data and generate reports. A YMS can be used by Integrated Device Manufacturers (IMD), fabs, fabless semiconductor companies, and Outsourced Semiconductor Assembly and Test (OSAT).

Those versed in the art will readily appreciate that the teachings of the presently disclosed subject matter are not bound by the system illustrated in FIG. 1; equivalent and/or modified functionality can be consolidated or divided in another manner, and can be implemented in any appropriate combination of software with firmware and/or hardware.

It should be noted that the examination system illustrated in FIG. 1 can be implemented in a distributed computing environment, in which the aforementioned functional modules shown in FIG. 1 can be distributed over several local and/or remote devices, and can be linked through a communication network. By way of example, the examination tool 120 and the system 101 can be located at the same entity (in some cases hosted by the same device), or distributed over different entities, depending on specific system configurations and implementation needs. By way of another example, system 101 (or at least the first ML model 105 thereof) and the reference generator 110 (or the second ML model 112 thereof) can be located at the same entity, or distributed over different entities.

It should be further noted that in other embodiments at least some of examination tools 120, storage unit 122 and/or GUI 124 can be external to the examination system 100 and operate in data communication with system 101 via I/O interface 126. System 101 can be implemented as stand-alone computer(s) to be used in conjunction with the examination tools, and/or with the additional examination modules, as described above. Alternatively, the respective functions of the system 101 can, at least partly, be integrated with one or more examination tools 120, thereby facilitating and enhancing the functionalities of the examination tools 120 in examination-related processes.

While not necessarily so, the process of operation of systems 101 and 100 can correspond to some or all of the stages of the methods described with respect to FIGS. 2-7. Likewise, the methods described with respect to FIGS. 2-7 and their possible implementations can be implemented by systems 101 and 100. It should therefore be noted that embodiments discussed in relation to the methods described with respect to FIGS. 2-7 can also be implemented, mutatis mutandis, as various embodiments of the systems 101 and 100, and vice versa.

Figure 2:
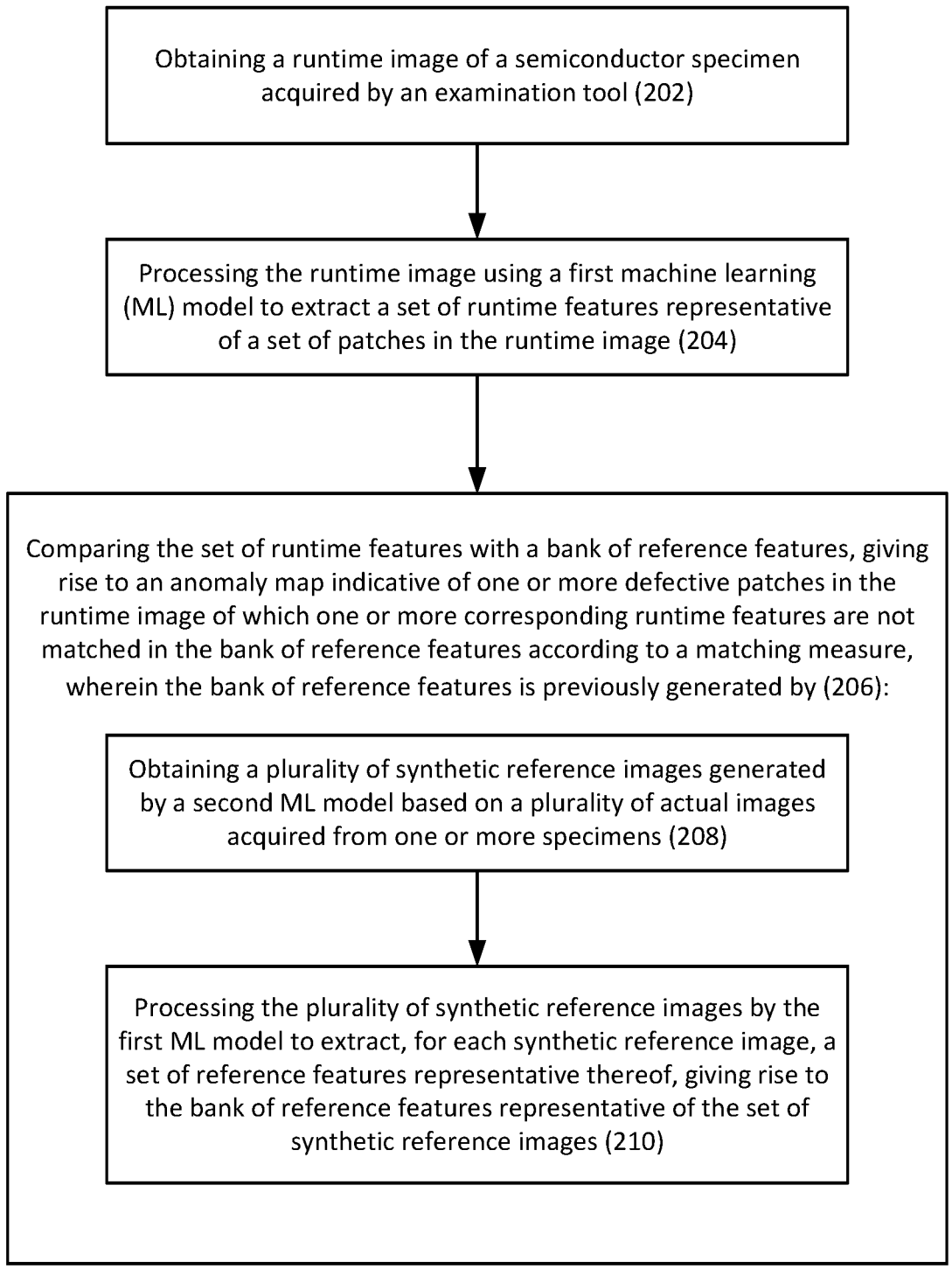
FIG. 2 illustrates a generalized flowchart of defect examination in accordance with certain embodiments of the presently disclosed subject matter.

Referring to FIG. 2, there is illustrated a generalized flowchart of defect examination in accordance with certain embodiments of the presently disclosed subject matter.

A runtime image of a semiconductor specimen acquired by an examination tool can be obtained (202) (e.g., by the PMC 102 from the examination tool 120). A semiconductor specimen here can refer to a production specimen, such as, e.g., a wafer, a die, or parts thereof, that is fabricated and examined in the fab during a fabrication process thereof. An image of a specimen can refer to an image capturing at least part of the specimen. By way of example, an image can capture a given region or a given structure (e.g., a structural feature or pattern on a semiconductor specimen), that is of interest, to be examined on a semiconductor specimen. For instance, the image can be an electron beam (e-beam) image acquired by an electron beam tool in runtime during in-line examination of the semiconductor specimen.

The fabrication process of a specimen typically comprises multiple processing steps. In some cases, a sampled set of processing steps can be selected therefrom for in-line examination, based on their known impacts on device characteristics or yield. Images of the specimen or parts thereof can be acquired at the sampled set of processing steps to be examined. For purpose of illustration only, certain embodiments of the following description are described with respect to images acquired for a specific processing step/layer of the sampled set of processing steps. Those skilled in the art will readily appreciate that the teachings of the presently disclosed subject matter are also applicable to multiple processing steps of a specimen.

The runtime image can be processed (204) (e.g., by the feature extractor 104) using a first machine learning (ML) model to extract a set of runtime features representative of a set of patches in the runtime image. As described above, the first ML model is also referred to as a representation model, or a ML model, based on representation-related algorithms. A representation model learns a representation of data that captures important characteristics of the input. The data representation can be used for different applications, such as, e.g., making predictions, classifications, or performing other tasks. The goal of representation learning is to automatically extract representative features from raw input at various levels to represent nominal behaviors/distribution thereof. By way of example, a representation model can be implemented using various DNN architectures, such as, e.g., CNN, KNN, etc.

Take CNN as an exemplary implementation of the representation model. CNN normally has a structure comprising an input and an output layer, as well as multiple hidden layers. The hidden layers of a CNN typically comprise a series of convolutional layers, subsequently followed by additional layers, such as pooling layers, fully connected layers, and normalization layers, etc. In some cases, a CNN can be regarded as being composed of two main functionalities: feature extraction and classification. By way of example, the feature extraction part can include several convolutional layers followed by max-pooling and an activation function. The classification part usually includes fully connected layers.

In some cases, a convolutional layer in the feature extraction part comprises a set of learnable filters. Each filter of a specific layer can be convolved across the width and height of an input volume, computing the dot product between the entries of the filter and the input, and producing an activation map which gives the responses of that filter at every spatial position. Stacking the activation maps for all filters along the depth dimension forms the full output feature maps of the convolution layer. In such ways, the CNN learns of filters that activate when it detects some specific type of features at some spatial position in the input.

In some embodiments, an input image can be divided into a set of input patches in accordance with a predetermined grid, patch size, or resolution. Each input patch forms an input volume to be convolved with the set of filters of a convolutional layer, as described above. The output of the convolution is an extracted feature, in the form of a feature vector (with a length corresponding to the depth of the filters), that is a representation of the input patch. This process repeats for each patch in the input image, giving rise to a set of feature vectors corresponding to the set of patches in the image.

As CNN comprises a series of convolutional layers, the set of feature vectors can be extracted from one of the convolutional layers of the CNN. Typically, early layers of deep neural networks learn lower-level features, while deeper layers learn more high-level features. In some embodiments of the present disclosure, it is proposed to take the output features from an intermediate layer thereof, so as to avoid the extracted features to be too generic, or too specific thus heavily relies on the specific training data. In some embodiments, the set of feature vectors, as extracted, are locally aware patch-level features which are capable of retaining spatial and nominal context at a local neighborhood, thus providing good representation of the input and assisting to achieve higher prediction performance. The local awareness refers to the spatial location of each patch in the entire image, which can be obtained, e.g., by adding a spatial index to the feature vector indicative of the x, y coordinates of the patch within the image.

Figure 5:
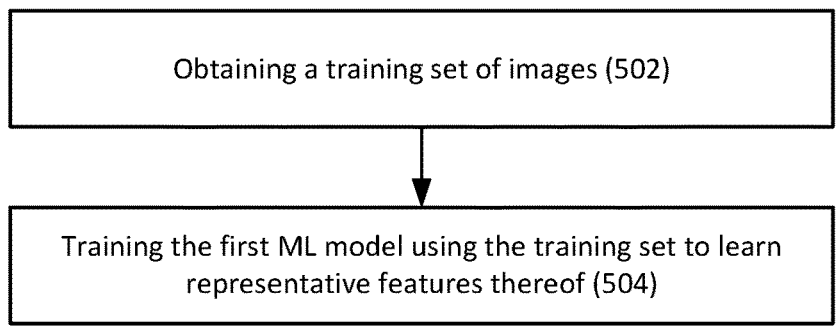
FIG. 5 illustrates a generalized flowchart of a training process for the first ML model in accordance with certain embodiments of the presently disclosed subject matter.

The first ML model used in the processing in block 204 is a trained ML model. As described in FIG. 5 illustrating a training process for the first ML model, a training set of images can be obtained (502), and the first ML model can be pre-trained (504) during a training phase using the training set of images to learn representative features thereof. By way of example, in some cases, the first ML model can be pre-trained using a publicly available training set, such as, e.g., the ImageNet dataset which includes a large number of images of various categories of objects. In such cases, although the training images are of different categories with respect to images of semiconductor specimens, it is proven that the model trained using such training images can be adaptively used for processing semiconductor images and extracting generic representative features.

By way of another example, in some other cases, the first ML model can be pre-trained using a training set of images collected from one or more semiconductor specimens, such as SEM images of the specimens. In some cases, the training set of images can include only nominal images, where the ML model can be trained under unsupervised learning. In some cases, the training set can include a majority of nominal images with optionally a small portion of defective images. In some further cases, the training set can include a subset of nominal images and a subset of defective images with corresponding labels, where the ML model can be trained under supervised learning. By way of further example, the first ML model can be first trained using the publicly available training set, e.g., the ImageNet dataset, and then trained using a training set of images collected from one or more semiconductor specimens (in a similar manner as in transfer learning).

The first ML model can be trained for various purposes and applications, such as, e.g., classification, image recognition, image reconstruction, etc. The first ML model can be trained using unsupervised or supervised learning, depending on the training data and the applications. By way of example, training of the CNN can be performed by iteratively adjusting the weights and/or threshold values of the network using back propagation during each epoch, so that the prediction matches the ground truth (i.e., the loss function is minimized to a certain level/threshold). After the weight adjustment in each epoch, the CNN improves in terms of prediction accuracy, and eventually it achieves an optimal set of weights in a trained model meeting the performance requirements. Once the CNN is trained, the feature extraction part of the network can be used in runtime for extracting representative features of runtime images. The present disclosure is not limited by the specific ways and applications for training the first ML model.

Once the set of runtime features are extracted by the first ML model, the set of runtime features can be compared (206) (e.g., by the anomaly detector 206 in the PMC 102) with a bank of reference features, giving rise to an anomaly map indicative of one or more defective patches in the runtime image of which one or more corresponding runtime features are not matched in the bank of reference features according to a matching measure.

Figure 3:
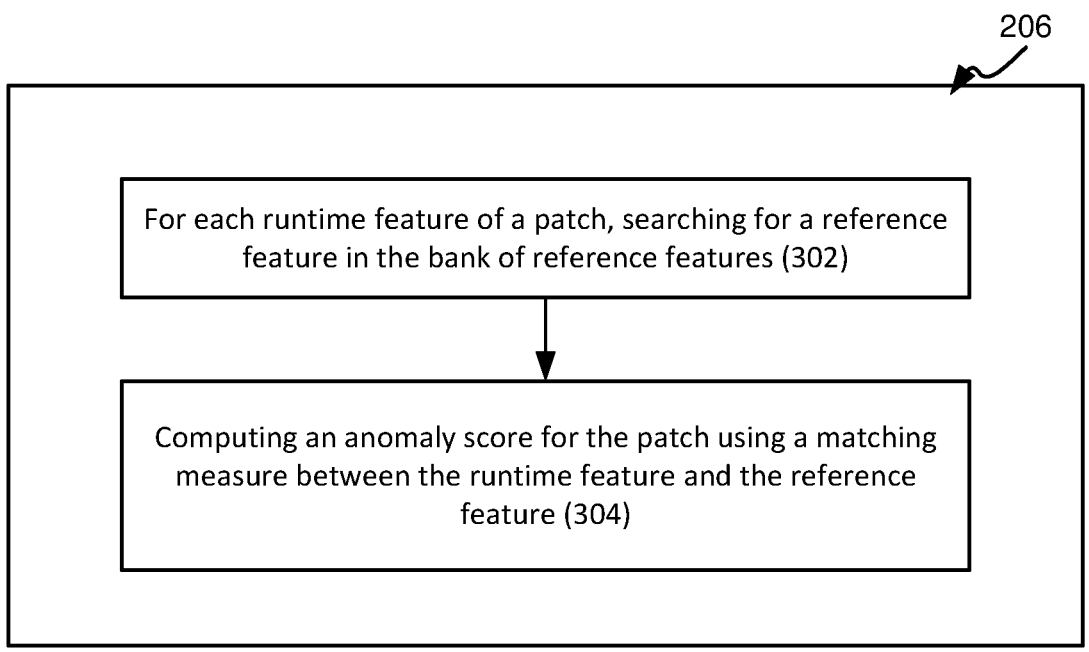
FIG. 3 illustrates a generalized flowchart of generating the anomaly map in accordance with certain embodiments of the presently disclosed subject matter.

FIG. 3 illustrates a generalized flowchart of generating the anomaly map in accordance with certain embodiments of the presently disclosed subject matter.

Specifically, for each runtime feature representative of a respective patch (from the set of patches), a reference feature can be searched (302) in the bank of reference features. By way of example, a searching algorithm, such as, e.g., nearest neighbor search can be used for finding the reference feature. Nearest neighbor search refers to finding the feature in a given set that is closest (or most similar) to a given feature. Closeness can be defined in terms of a matching measure, such as, e.g., a similarity measure (or dissimilarity measure). By way of example, the similarity measure can be expressed as a distance metric, such as, e.g., Euclidean Distance, Feature Distance, Cosine or Manhattan Distance, etc. In cases where each runtime feature or reference feature is represented in the form of a feature vector, the bank of reference features can be represented in a multi-dimensional vector space, where similarity can be measured using, e.g., the Euclidean distance, Manhattan distance, or other distance metric. The reference feature vector in the bank that is closest in distance to a given runtime feature is selected as the reference feature for the runtime feature.

An anomaly score can be computed (304) for the respective patch using the matching measure between the runtime feature and the selected reference feature. By way of example, the anomaly score can represent the distance calculated using the distance metric between the runtime feature and the reference feature. The anomaly score for a given patch can indicate patch-level probabilities of the presence of defects in the given patch. The anomaly score of each patch in the set of patches together constitute the anomaly map which indicates patch-level probabilities of presence of defects in the input image.

In some cases, a predefined anomaly threshold can be applied to the anomaly scores in the anomaly map. For instance, for a patch whose anomaly score is higher than the threshold, a value of 1 will be applied, otherwise a value of 0 will be applied. In such ways, the anomaly map can be transformed into a binary segmentation map, where one or more defective patches are identified. In some cases, the input image, or a given structure thereof, can be determined as defective if at least one defective patch thereof is identified.

Continuing with the description of FIG. 2, the bank of reference features can be previously generated during a setup phase and stored in a memory bank (e.g., the memory bank can be comprised as part of the storage unit 122). Specifically, a plurality of synthetic reference images can be obtained (208). The plurality of synthetic reference images can be generated by a second ML model based on a plurality of actual images acquired from one or more specimens. The one or more specimens can be from, e.g., a set of specimens that were previously examined during a fabrication process. The second ML model is previously trained for reference image simulation. A reference image refers to a defect-free image which is used as a reference to be compared to an inspection image for defect detection in a die-to-reference detection algorithm, as described above.

For purpose of avoiding any disadvantages of acquiring an actual reference image, such as doubled tool time for image acquisition and additional image processing for noise/variation compensation, etc., it is proposed to generate synthetic reference images using a second ML model. The second ML model is thus also referred to as a generative model. A generative model used herein refers to a ML model that is trained to learn to generate new data instances. A generative model can be trained in different manners using supervised learning or unsupervised learning.

In some embodiments, the second ML model can be trained using unsupervised learning based on a training set of nominal images of one or more training specimens. A nominal image is also referred to as a defect-free image. It is a clean image, free of defective features, or has a high probability of not comprising any defective features. The training set of nominal images can be collected from "real-world"/actual images of the training specimens, or, alternatively, at least part of the images can be simulated, based on design data of the specimens.

By way of example, the ML model can be implemented as an autoencoder (AE) or variations thereof (e.g., VAE). Autoencoder is a type of neural network commonly used for the purpose of data reproduction by learning efficient data coding and reconstructing its inputs (e.g., minimizing the difference between the input and the output). The autoencoder has an input layer, an output layer, and one or more hidden layers connecting them. Generally, an autoencoder can be regarded as including two parts, the encoder network and the decoder network. The autoencoder learns to compress data from an input layer into a short code (i.e., the encoder network), and then decompress that code into an output that closely matches the original data (i.e., the decoder network). The output of the encoder is referred to as code, latent variables, or latent representation representative of the input image. The code can pass the hidden layers in the decoder, and can be reconstructed to an output image corresponding to the input image in the output layer.

For each input nominal image in the training set, the autoencoder can extract features representative of the input image, and use the representative features to reconstruct a corresponding output image which can be evaluated by comparing with the input image. The autoencoder is trained and optimized so as to learn the representative features in the input training images (e.g., the features can be representative of, e.g., structural elements, patterns, pixel distribution, etc., in the training images). As the training images are nominal images, the autoencoder is trained to learn the distribution of normal patterns and characteristics of defect-free images.

Once the autoencoder is trained based on the training set, the trained autoencoder is capable of generating, for each input image, a reconstructed output image that closely matches the input, based on the latent representation thereof. As the autoencoder is trained with only nominal images, it will not be able to reconstruct anomaly patterns (defective patterns) that were not observed during training. In cases where the input image is a defective image, the autoencoder will reconstruct a corresponding defect-free image of the defective image. Therefore, the trained autoencoder can be used for generating a synthetic reference image for a given real/actual image of a specimen which is actually acquired by an examination tool.

Except for the autoencoder, the second ML model can be implemented as various models, such as, e.g., generative adversarial network (GAN), Vision Transformer (ViT), etc., with unsupervised learning mode.

Figure 6:
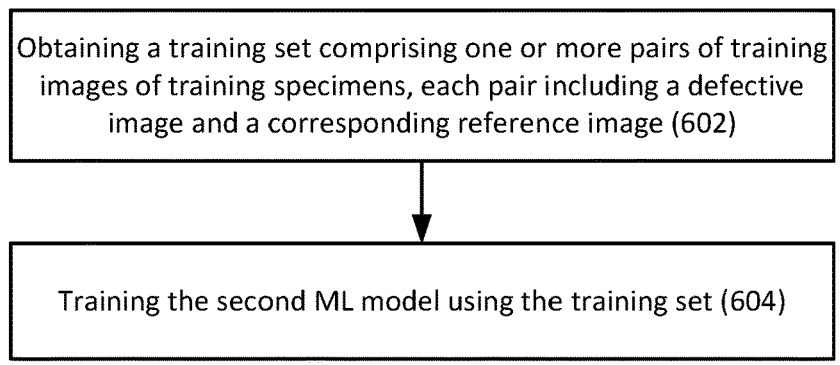
FIG. 6 illustrates a generalized flowchart of a training process for the second ML model in accordance with certain embodiments of the presently disclosed subject matter.

In some embodiments, the second ML model can be trained using supervised learning. By way of another example, as illustrated in FIG. 6, a training set comprising one or more pairs of training images of training specimens can be obtained (602), each pair including a defective image and a corresponding reference image. The second ML model can be trained (604) using supervised learning based on the training set.

A defective image used herein refers to an image that comprises, or has a high probability of comprising, defective features representative of actual defects on a specimen. The reference image corresponds to the defective image in a sense that it captures a similar region containing similar patterns as of the defective image. The reference image serves as the ground truth data associated with the defective image in the same pair. The ML model is trained to learn the non-linear mapping relationship between the two populations of defective images and reference images.

In some cases, the training images, such as the defective image and the reference image in each pair, can be "real world" images (i.e., actual images) of a semiconductor specimen acquired by an examination tool during a fabrication process of the specimen. In some cases, at least one of the defective image, and/or the reference image in a pair, can be a simulated image. By way of example, the reference image can be simulated based on the design data of the semiconductor specimen.

The training of the second ML model comprises, for each pair of the one or more pairs of training images, processing the defective image by the second ML model to obtain a predicted image, and optimizing the second ML model to minimize a difference between the predicted image and the reference image. In some embodiments, the defective image and the reference image in each pair can be pre-processed before being fed to the ML model for training the model for the purpose of reducing the impacts of variations, such as process variations, gray level variations, etc., which are caused by certain physical processes of the specimens. The pre-processing can comprise one or more of the following operations: image registration, noise filtration, and image augmentation.

The reference images, as generated by the second ML model, are supposed to have less noise and variations such as process variations, and have improved alignment with the runtime images. Using a reference image generated as such can produce quality extracted features, as compared to features extracted based on actual reference/nominal images which possesses inherent misalignment and variations, thus improving defect detection performances.

Referring back to FIG. 2, once the plurality of synthetic reference images generated by the second ML model are obtained, they are processed (210) by the first ML model to extract, for each synthetic reference image, a set of reference features representative thereof, in a similar manner as described above with reference to block 204. The set of reference features for each synthetic reference image together constitutes the bank of reference features representative of the set of synthetic reference images. The bank of reference features describing what normal image patches look like can be stored in a memory bank in the storage unit of system 100.

Figure 4:
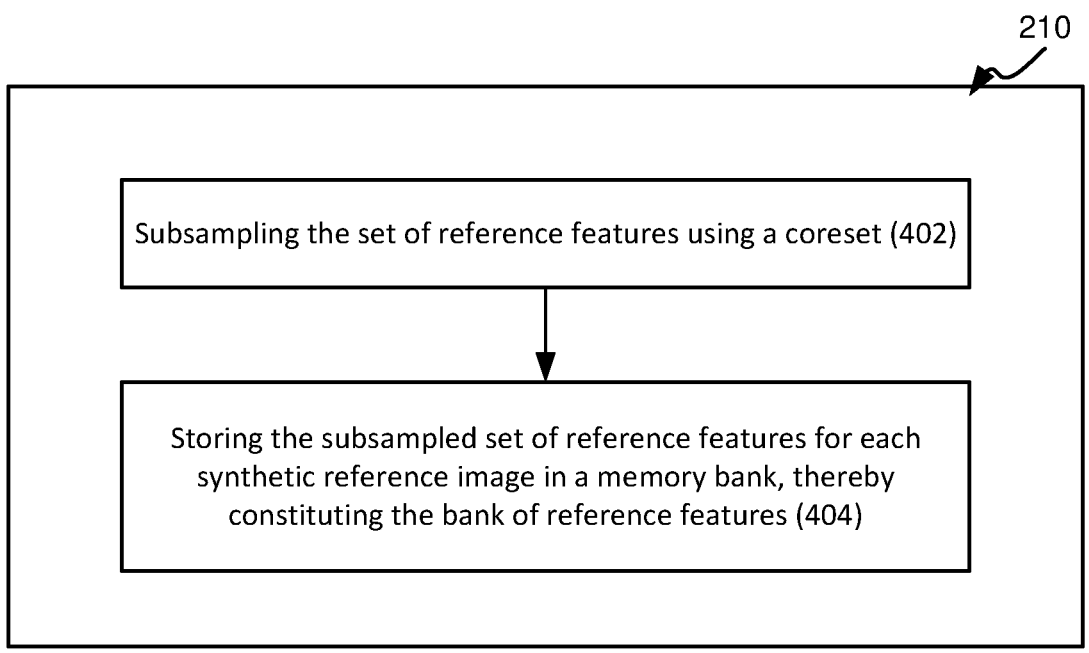
FIG. 4 illustrates a generalized flowchart of subsampling the reference features in accordance with certain embodiments of the presently disclosed subject matter.

In some cases, the memory bank may quickly become quite large, as it stores a large set of feature vectors of patch representations from each image in a large number of synthetic reference images. To reduce the size of the memory bank, but still remain as representative of the whole population as possible, in some cases the bank of reference features can be approximated using subsampling techniques. FIG. 4 illustrates a generalized flowchart of subsampling the reference features in accordance with certain embodiments of the presently disclosed subject matter.

As shown, the processing of the plurality of synthetic reference images as described with reference to block 210 can further comprise, upon the set of reference features being extracted for each synthetic reference image, subsampling (402) the set of reference features using a sampling technique, such as, e.g., coreset-based subsampling. Coreset subsampling aims to select, from a larger set of samples, a subset of the most informative and representative samples that approximates the geometric shape of the larger set (e.g., in the feature space). A coreset can manage to achieve the same algorithm performance as of the whole set with less computations. By way of example, a minimax facility location coreset selection can be used, where it selects a coreset such that the maximum distance of any sample in the original set to the closest sample in the coreset is minimized.

The subsampled set of reference features for each synthetic reference image can be stored (404) in the memory bank, thereby constituting the bank of reference features. As described above, a nearest neighbor search is used in some cases when searching for a reference feature in the bank of reference features to detect defects. Searching in a large number of reference features without subsampling would be computationally too costly for inference time. Using a subsampled set of features by coreset subsampling provides sufficient representation of the entire population, while significantly reducing processing time in inference.

It should be noted that using the set of synthetic reference images (instead of a set of actual nominal images) as the input of the first ML model for extracting reference features, has been proven to improve defect detection performance. By way of example, defect detection performance, as represented in the anomaly map, such as, e.g., the defect detection rate (also referred to as recall) is increased as compared to using a set of actual nominal images as the input for the first ML model, while the false alarm rate is reduced (i.e., the filter rate is increased). This is possibly achieved at least because the synthetic reference images are artificial images generated by the ML model, thus possess less noise and less variations, such as e.g., process variations, as compared to actual nominal images, while preserve better alignment with respect to the input runtime images.

An example of a first ML model (i.e., representation model) can be based on representation based algorithms, such as, e.g., PatchCore algorithms. Alternatively, the first ML model can be implemented based on other representation based algorithms, such as SPADE, PaDiM, etc.

As described above, in some embodiments, the defective patches identified in the anomaly map can be used as defective training samples to form part of a training set for training a ML model for defect examination. The training set can be enriched with the defective training samples, thus providing sufficient training data for training the ML model in terms of quantity, quality, and variety.

Figure 7:
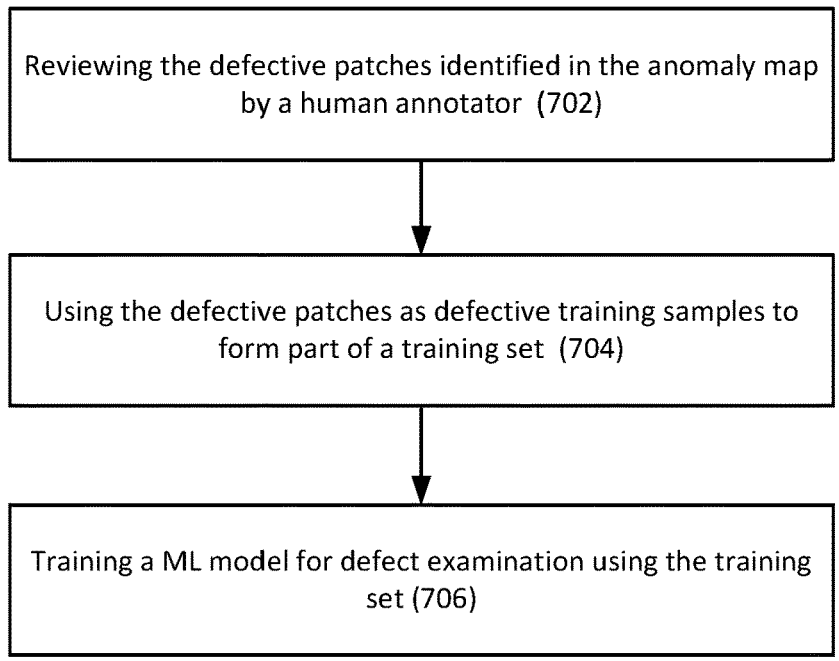
FIG. 7 illustrates a generalized flowchart of using the defective patches identified in the anomaly map in accordance with certain embodiments of the presently disclosed subject matter.

As illustrated in FIG. 7, in some cases, optionally, the defective patches identified in the anomaly map can be first reviewed (702) by a human annotator prior to being used (704) as defective training samples to form part of a training set. An ML model can be trained (706) for defect examination using the training set, e.g., under supervised learning.

By way of example, the ML model can be a model for ADR or ADC. In some cases, the model can be the same as the first ML model. In such cases, the first ML model is re-trained using the enriched training set, giving rise to a re-trained model with better detection performance.

Figure 8:
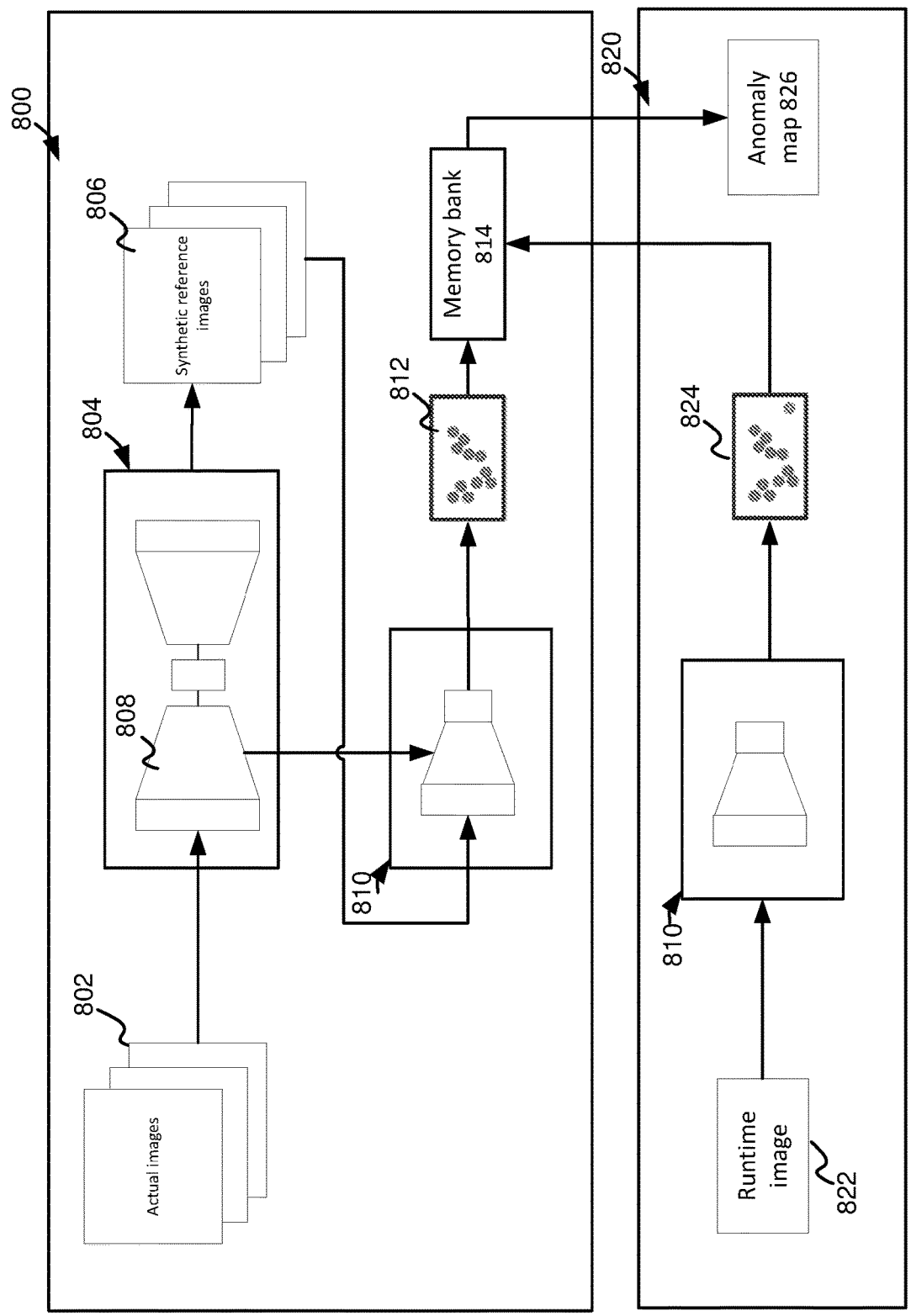
FIG. 8 illustrates a schematic illustration of a setup phase and an inference phase of the defect examination system in accordance with certain embodiments of the presently disclosed subject matter.

Turning now to FIG. 8, there is a schematic illustration of a setup phase and an inference phase of the defect examination system in accordance with certain embodiments of the presently disclosed subject matter.

During the setup phase 800 of the system, a plurality of actual images 802 are acquired by an examination tool from scanning one or more semiconductor specimens. The plurality of actual images 802 are fed into a second ML model 804 (e.g., a generative model) to process, giving rise to a plurality of synthetic reference images 806 as the output of the model 804. As described above, the second ML model 804 was previously trained in its training phase for reference image generation/simulation. The second ML model 804 is exemplified as an autoencoder in FIG. 8, which comprises an encoder network 808 and a decoder network. The encoder network 808 learns to compress input data to code representations, and the decoder network decompresses that code into an output that closely matches the original data. The encoder network comprises multiple convolutional layers, and the output of some intermediate convolutional layers thereof is referred to as feature vectors representative of the input image.

The synthetic reference images 806 generated by the generative model 804 are used as the input for a first ML model 810 (e.g., a representation model) to extract patch-level reference features 812 representative of the patches in the images. As described above, the representation model 810 is a pre-trained model and can be implemented as various types of ML models, such as, e.g., CNN.

In some embodiments, the representation model 810 can be implemented as the encoder network 808 of the generative model 804. In other words, once the generative model 804 is trained, the encoder network 808 which is capable of extracting features representative of the input image, can be used as the representation model 810. As the encoder network 808 is already properly trained when training the generative model 804, using the trained encoder network as the representation model can save training resources and efforts, including training data, computation power, and time, for training a different model, while providing sufficient quality of feature extraction, as it was trained using training images of semiconductor specimens, rather than natural images.

The patch-level reference features 812 can be optionally subsampled using Coreset, and the subsampled features can be stored in a memory bank 814.

In the inference phase 820, when receiving a runtime image 822 of a production specimen, the runtime image is processed by the representation model 810, giving rise to a set of runtime features 824 extracted from the runtime image 822. For each runtime feature, a nearest neighbor search can be used to search for a reference feature in the bank of reference features 812 stored in the memory bank 814. An anomaly score can be computed between the reference feature and the runtime feature, where all the anomaly scores constitute an anomaly map 826.

Although the runtime defect examination system may only comprise the trained representation model 810, in some cases, the generative model 804 and the representation model 810 together can form an integrated network architecture as part of the entire examination system 100.

According to certain embodiments, the process as described above with reference to FIG. 2 can be included as part of an examination recipe usable by the examination system 100 and/or the examination tool 120 for online examination in runtime. It is to be noted that the term "examination recipe" should be expansively construed to cover any recipe that can be used by an examination tool for any examination application, including the embodiments as described above.

It should be noted that examples illustrated in the present disclosure, such as, e.g., the exemplary ML models, the training data and processes, the examination tools, and applications, etc., are illustrated for exemplary purposes, and should not be regarded as limiting the present disclosure in any way. Other appropriate examples/implementations can be used in addition to, or in lieu of the above.

Among advantages of certain embodiments of the defect examination system and method as described herein is that the defect detection performance is significantly improved by using the set of synthetic reference images (instead of a set of actual nominal images) as the input of the first ML model for extracting reference features. By way of example, the defect detection performance, as represented in the anomaly map, such as, e.g., the defect detection rate (also referred to as recall) is increased, as compared to using a set of actual nominal images as the input for the first ML model, while the false alarm rate is reduced (i.e., the filter rate is increased). This is possibly achieved at least because the synthetic reference images are artificial images generated by the ML model, thus possess less noise and less variations such as e.g., process variations, as compared to actual nominal images, while preserving better alignment with respect to the input runtime images.

Among further advantages of certain embodiments of the process monitoring system and method as described herein is that the defective patches identified in the anomaly map can be used as defective training samples to enrich a training set, thus providing sufficient training data for training a ML model for defect examination in terms of quantity, quality, and variety.

Among further advantages of certain embodiments of the process monitoring system and method as described herein is that using the encoder network of the generative model (upon the generative model being trained) as the representation model, can save training resources and efforts for training a new representation model, while providing sufficient quality of feature extraction, as the encoder network was properly trained when training the generative model using training images of semiconductor specimens, rather than natural images.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized system of examining a semiconductor specimen, the system comprising a processing and memory circuitry (PMC) configured to:
   obtain a runtime image of the semiconductor specimen acquired by an examination tool;
   process the runtime image using a first machine learning (ML) model to extract a set of runtime features representative of a set of patches in the runtime image, wherein the first ML model is previously trained and usable for feature extraction; and
   compare the set of runtime features with a bank of reference features, giving rise to an anomaly map indicative of one or more defective patches in the runtime image of which one or more corresponding runtime features are not matched in the bank of reference features according to a matching measure, wherein the bank of reference features is previously generated by:
      obtaining a plurality of synthetic reference images generated by a second ML model based on a plurality of actual images acquired from one or more specimens, wherein the second ML model is previously trained for reference image simulation; and
      processing the plurality of synthetic reference images by the first ML model to extract, for each synthetic reference image, a set of reference features representative thereof, giving rise to the bank of reference features representative of the set of synthetic reference images.

2. The computerized system according to claim 1, wherein the processing the plurality of synthetic reference images further comprises subsampling the set of reference features using a coreset, and storing the subsampled set of reference features for each synthetic reference image in a memory bank, thereby constituting the bank of reference features.

3. The computerized system according to claim 1, wherein the comparing comprises, for each runtime feature of a respective patch, searching for a reference feature in the bank of reference features, and computing an anomaly score for the respective patch using the matching measure between the runtime feature and the reference feature, wherein the anomaly score for each patch constitutes the anomaly map corresponding to the runtime image.

4. The computerized system according to claim 1, wherein the runtime image is divided into the set of patches in accordance with a predetermined grid, and each runtime feature is represented as a feature vector corresponding to a respective patch.

5. The computerized system according to claim 1, wherein the first ML model is a representation model previously trained using a training set of images to learn representative features thereof.

6. The computerized system according to claim 1, wherein the second ML model is a generative model previously trained using unsupervised learning based on a training set of nominal images of one or more training specimens.

7. The computerized system according to claim 1, wherein the second ML model is a generative model previously trained using supervised learning based on a training set comprising one or more pairs of training images of training specimens, each pair including a defective image and a corresponding reference image.

8. The computerized system according to claim 1, wherein the second ML model comprises an encoder network and a decoder network, and the first ML model is implemented using the encoder network of the second ML model upon the second ML model being trained.

9. The computerized system according to claim 1, wherein the defective patches identified in the anomaly map are usable as defective training samples to form part of a training set for training a ML model for defect examination.

10. The computerized system according to claim 9, wherein the defective patches identified in the anomaly map are reviewed by a human annotator prior to being used as part of the training set.

11. The computerized system according to claim 1, wherein defect detection performance represented in the anomaly map is improved by using the set of synthetic reference images as compared to using a set of actual nominal images.

12. A computerized method of examining a semiconductor specimen, the method comprising:
   obtaining a runtime image of the semiconductor specimen acquired by an examination tool;
   processing the runtime image using a first machine learning (ML) model to extract a set of runtime features representative of a set of patches in the runtime image, wherein the first ML model is previously trained and usable for feature extraction; and
   comparing the set of runtime features with a bank of reference features, giving rise to an anomaly map indicative of one or more defective patches in the runtime image of which one or more corresponding runtime features are not matched in the bank of reference features according to a matching measure, wherein the bank of reference features is previously generated by:
      obtaining a plurality of synthetic reference images generated by a second ML model based on a plurality of actual images acquired from one or more specimens, wherein the second ML model is previously trained for reference image simulation; and
      processing the plurality of synthetic reference images by the first ML model to extract, for each synthetic reference image, a set of reference features representative thereof, giving rise to the bank of reference features representative of the set of synthetic reference images.

13. The computerized method according to claim 12, wherein the processing the plurality of synthetic reference images further comprises subsampling the set of reference features using a coreset, and storing the subsampled set of reference features for each synthetic reference image in a memory bank, thereby constituting the bank of reference features.

14. The computerized method according to claim 12, wherein the comparing comprises, for each runtime feature of a respective patch, searching for a reference feature in the bank of reference features, and computing an anomaly score for the respective patch using the matching measure between the runtime feature and the reference feature, wherein the anomaly score for each patch constitutes the anomaly map corresponding to the runtime image.

15. The computerized method according to claim 12, wherein the first ML model is a representation model previously trained using a training set of images to learn representative features thereof.

16. The computerized method according to claim 12, wherein the second ML model is a generative model previously trained using supervised learning based on a training set comprising one or more pairs of training images of training specimens, each pair including a defective image and a corresponding reference image.

17. The computerized method according to claim 12, wherein the second ML model comprises an encoder network and a decoder network, and the first ML model is implemented using the encoder network of the second ML model upon the second ML model being trained.

18. The computerized method according to claim 12, wherein the defective patches identified in the anomaly map are usable as defective training samples to form part of a training set for training a ML model for defect examination.

19. The computerized method according to claim 12, wherein defect detection performance represented in the anomaly map is improved by using the set of synthetic reference images as compared to using a set of actual nominal images.

20. A non-transitory computer readable storage medium tangibly embodying a program of instructions that, when executed by a computer, cause the computer to perform a method of examining a semiconductor specimen, the method comprising:
  obtaining a runtime image of the semiconductor specimen acquired by an examination tool;
  processing the runtime image using a first machine learning (ML) model to extract a set of runtime features representative of a set of patches in the runtime image, wherein the first ML model is previously trained and usable for feature extraction; and
  comparing the set of runtime features with a bank of reference features, giving rise to an anomaly map indicative of one or more defective patches in the runtime image of which one or more corresponding runtime features are not matched in the bank of reference features according to a matching measure, wherein the bank of reference features is previously generated by:
    obtaining a plurality of synthetic reference images generated by a second ML model based on a plurality of actual images acquired from one or more specimens, wherein the second ML model is previously trained for reference image simulation; and
    processing the plurality of synthetic reference images by the first ML model to extract, for each synthetic reference image, a set of reference features representative thereof, giving rise to the bank of reference features representative of the set of synthetic reference images.

* * * * *